(12) United States Patent
Pogorelik et al.

(10) Patent No.: US 9,654,903 B2
(45) Date of Patent: May 16, 2017

(54) SYSTEM FOR SECURING AN NFC TRANSACTION

(71) Applicant: Intel Corporation, Santa Clara, CA (US)

(72) Inventors: Oleg Olegp Pogorelik, Lapid (IL); Alex Nayshtut, Gan Yavne (IL); Avi Apriev Priev, Jerusalem (IL); Shahar Porat, Geva Carmel (IL); Michael Raziel, Jeruslaem (IL)

(73) Assignee: INTEL CORPORATION, Santa Clara, CA (US)

( * ) Notice: Subject to any disclaimer, the term of this patent is extended or adjusted under 35 U.S.C. 154(b) by 21 days.

(21) Appl. No.: 14/580,627

(22) Filed: Dec. 23, 2014

(65) Prior Publication Data

US 2016/0183032 A1    Jun. 23, 2016

(51) Int. Cl.
| | |
|---|---|
| *H04B 5/00* | (2006.01) |
| *H04W 4/00* | (2009.01) |
| *H04W 12/04* | (2009.01) |
| *H04W 12/06* | (2009.01) |

(52) U.S. Cl.
CPC ........... *H04W 4/008* (2013.01); *H04W 12/04* (2013.01); *H04W 12/06* (2013.01)

(58) Field of Classification Search
CPC .......... H04W 4/008; H04W 4/06; H04W 4/04
USPC ........ 455/41.1–41.3, 410–411, 552.1, 553.1; 726/5, 14, 18, 19
See application file for complete search history.

(56) References Cited

U.S. PATENT DOCUMENTS

| | | | | |
|---|---|---|---|---|
| 9,356,777 | B2* | 5/2016 | Denny | ................ H04L 9/0822 |
| 2012/0138693 | A1* | 6/2012 | Litz | ..................... G06K 7/1095 235/494 |
| 2013/0041831 | A1 | 2/2013 | Das | |
| 2014/0244513 | A1 | 8/2014 | Ballesteros | |
| 2014/0310182 | A1* | 10/2014 | Cummins | .......... G06Q 20/4012 705/71 |
| 2015/0312240 | A1* | 10/2015 | Fu | ........................ H04W 4/008 726/5 |

* cited by examiner

*Primary Examiner* — Alejandro Rivero
*Assistant Examiner* — Angelica M Perez
(74) *Attorney, Agent, or Firm* — Jason H. Vick; Sheridan Ross, PC

(57) ABSTRACT

Techniques for connecting using NFC communications are provided. Specifically, methods are presented, that when taken alone or together, provide a device or group of devices with a secure way of transferring data from a wireless device to a reader. The present disclosure includes a method that provides a wireless device with network connectivity options that enable a more secure means for using NFC communications for completing a secure transaction using a secondary code.

23 Claims, 8 Drawing Sheets

SYSTEM FOR SECURING AN NFC TRANSACTION

TECHNICAL FIELD

Embodiments pertain to wireless networks. Some embodiments relate to wireless communications that operate in accordance with Near Field Communication (NFC) standards approved as ISO/IEC (ISO/IEC 18092) and ECMA (ECMA-340). Some embodiments relate to communications between a wireless device and a reader using a method for securing an NFC transaction.

BACKGROUND

Near Field Communication (NFC) is a technology that enables contactless short-range wireless data transfer and is rapidly becoming one of the most convenient interfaces for performing secure operations. As such, NFC technology is now widely available in most all modern devices and is being used for various transactions ranging from wireless payments to file transfers and location access. However, the data transfer occurs only after a reciprocal connection is established between the communication devices.

A number of issues arise from this scenario. One such issue is that as the reciprocal connection is being established, the wireless data can become vulnerable to network attacks such as man-in-the middle attacks or other attacks that use range-extenders. Another such issue is the use of a Personal Identification Number (PIN) by current systems as a securing mechanism. The required PIN input can become cumbersome for a user, introduce vulnerabilities and increase the system complexity. It is with this and other considerations that the present improvements have been developed.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
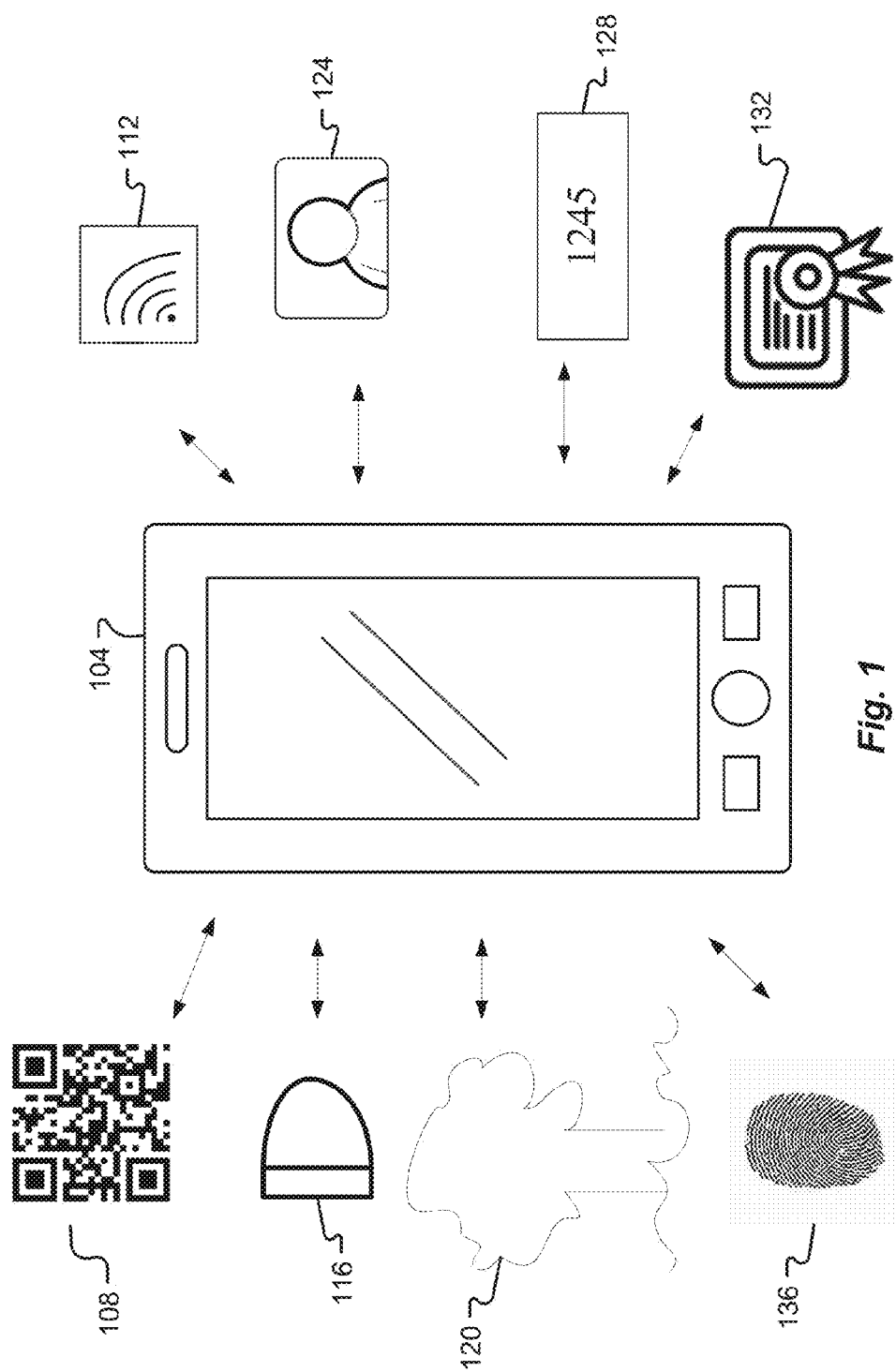
FIG. 1 illustrates an exemplary wireless device.

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. Embodiments may be implemented as part of the Bluetooth® Special Interest Group (SIG), standardized as IEEE 802.15. Embodiments may be implemented as part of the ISO/IEC 18092/ECMA-340 Near Field Communication Interface and Protocol-1 (NFCCIP-1). Embodiments may be implemented as part of ISO/IEC 21481/ECMA-352 Near Field Communication Interface and Protocol-2 (NFCIP-2). Embodiments may be implemented as part of the ISO/IEC 18004:2006 standards. However, the embodiments are not limited to 802.11 standards, Hotspot 2.0, Bluetooth® standards, and NFC standards. Embodiments can be used in implementation with other wireless communications standards and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however, that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a reader, a network operation or management device, a node or collocated on a particular node of a distributed network, such as a communications network. As will be appreciated from the following description, and for reasons of computational efficiency, the components of the system can be arranged at any location within a distributed network without affecting the operation thereof.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operation or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, data structures, user interfaces, etc. The embodiments may relate to a communication device and/or communication system. The communication system can include NFC communications. The NFC communications can include communication and association between two or more devices for completing a secure transaction. The overall design and functionality of the system described herein is, as one example, to provide a more secure means for a device to complete a transaction using NFC communications in conjunction with a secondary code.

Embodiments provide novel solutions that facilitate secured NFC transactions. The embodiments generally introduce the use of a key for unlocking the transactional data transmitted over an NFC communication channel. As a result, a more reliable and secure transaction is completed while improving user experience by removing or decreasing required user input in completing the transaction. Other advantages exist as well as will be discussed herein.

A general wireless device 104 is shown in FIG. 1. The wireless device 104 can communicate with various devices via a wired and/or wireless communication channel. In general, various techniques and configurations are available for a wireless device 104 to communicate with other communication devices, such as a reader. Exemplary communication networks and capabilities supported by the wireless device are included below and in conjunction with FIG. 2. Further, the wireless device 104 can transmit and transfer data using one or more added secure codes. The added secure codes can come from numerous sources such as, but not limited to Quick Response (QR) codes 108, Infrared (IR) codes 116, drawings 120, fingerprints 136, pictures 124, Personal Identification Numbers (PINs) 128, digital certificates 132, biometric information, etc. For example, NFC transaction data 112 can be combined with a picture 124 for added security. Further details regarding device pairing and secure transactions are described below and in conjunction with FIGS. 2-8.

Figure 2:
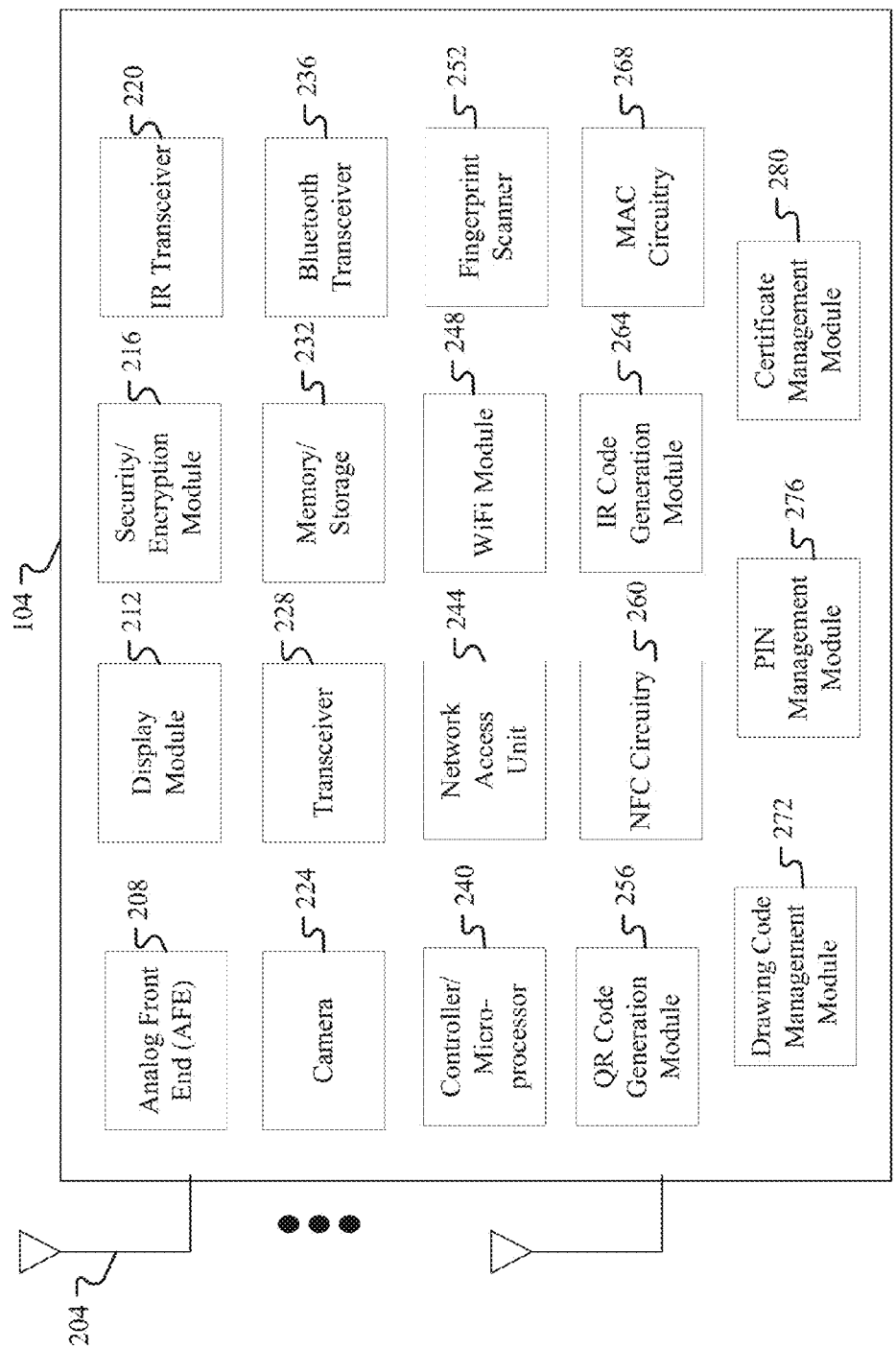
FIG. 2 illustrates an exemplary wireless device architecture.

An example of a wireless device 104 architecture is shown in FIG. 2. The wireless device 104 may comprise hardware circuitry and/or software that conduct various operations illustrated herein. The wireless device 104 also includes conventional and well known components which have been omitted for clarity. The operations can include, but are not limited to, conducting calls, opening multiple applications, presenting information through audio and/or video means, taking pictures, communicating via NFC, Infrared (IR), Bluetooth®, Wi-Fi, etc. The wireless device 104 can be any type of computing system operable to conduct the operations described here. As an example, the wireless device 104 can be for example, a smart phone or laptop, which includes and interacts with various modules and components 208-280 as shown in FIG. 2.

The wireless device 104 can have one more antennas 204, for use in wireless communications such as multi-input multi-output (MIMO) communications, Bluetooth®, NFC communications, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which is needed to enable the correct processing of the received modulated signal. The AFE 208 can sit between the antenna and a digital baseband system in order to convert the analog signal into a digital signal for processing.

The wireless device 104 can also include a controller/microprocessor 240 and a memory/storage 232. The wireless device 104 can interact with the memory/storage 232 which may store information and operations necessary for configuring and transmitting or receiving the message frames described herein. The memory/storage 232 may also be used in connection with the execution of application programming or instructions by the controller/microprocessor 240, and for temporary or long term storage of program instructions and/or data. As examples, the memory/storage 232 may comprise a computer-readable device, RAM, ROM, DRAM, SDRAM or other storage devices and media.

The controller/microprocessor 240 may comprise a general purpose programmable processor or controller for executing application programming or instructions related to the wireless device 104. Further, controller/microprocessor 240 can perform operations for configuring and transmitting information as described herein. The controller/microprocessor 240 may include multiple processor cores, and/or implement multiple virtual processors. Optionally, the controller/microprocessor 240 may include multiple physical processors. By way of example, the controller/microprocessor 240 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The wireless device 104 can further include a transceiver 228 which can transmit and receive signals, to and from other wireless devices 104 and/or communication devices using one or more antennas 204. Similarly, other transceivers within the wireless device architecture can include an infrared (IR) transceiver 220 and a Bluetooth® Transceiver 236 for transmission and reception of infrared codes/pulses and other data, respectively.

Included in the wireless device 104 circuitry is the medium access control or MAC Circuitry 268. MAC circuitry 268 provides the medium for controlling access to the wireless medium. In an exemplary embodiment, the MAC circuitry 268 may be arranged to contend for a wireless medium and configure frames or packets for communicating over the wireless medium. The MAC circuitry 268 can work together or independently of NFC Circuitry 260, which can enable the transmission of data from the wireless device 104 to another communication device. The NFC Circuitry 260 can include the processing required for the short range communication and encode electric or magnetic fields with data for transmission. The NFC Circuitry 260 can also work jointly with antennas 204. Antennas 204 can produce an electric or magnetic field that can be detected by another communication device for the NFC transaction. For example in an NFC purchasing transaction, the wireless device 104 can transmit a modulated magnetic field which can contain the carrier signal containing secured credit card information which can be detected by an NFC enabled device for processing the purchase.

The wireless device 104 can also contain a security/encryption module 216. This security/encryption module 214 can contain information regarding but not limited to, security parameters required to connect the wireless device 104 to a communication device(s) or other available networks, and can include WEP or WPA security access keys, network keys, etc. The WEP security access key is a security password used by Wi-Fi networks. Knowledge of this code will enable the wireless device 104 to exchange information with a communication device. The information exchange can occur through encoded messages with the WEP access code often being chosen by the network administrator. WPA is an added security standard that is also used in conjunction with network connectivity with stronger encryption than WEP. Further, the security/encryption module 216 can also be used in other security and/or encryption type processing such as adding the encryption need to establish secure channels like those required in NFC communications (i.e., SSL).

A display module 212 can also be part of the wireless device 104 architecture. The display module 212 can also include other output devices including but not limited to, speakers, printers, etc. The display module 212 can be used in displaying information such as data, video, QR codes, pictures, digital fingerprints, photographs, and other such digital information. The display module 212 can work independently or in conjunction with a camera module 224. This camera module 224 includes a camera device that can be used to take photographs and/or video and read optical codes which can be displayed on the display screen located within the display module 212.

The wireless device 104 architecture can also include a QR code generation module 256. The QR code generation module 256 is a module that can generate matrix barcodes such as QR codes. The QR codes generated by the QR code generation module 256 can be optically read by a camera on a communication device and processed for data transfer from the wireless device 104 to the communication device. Similarly, the Infrared (IR) code generation module 264 can generate light pulses that can be read by an IR reader. The IR code can also be used for data transfer between devices and in some instances in conjunction with other transactions. For example, an IR code can be generated and transferred to a communication device as added security in an NFC transaction.

Further, the wireless device 104 can include modules designed to generate, upload, scan, etc., unique codes for data transfer. For example, PIN management module 276 can include a random number generator which creates unique PIN identifiers which can be used for a secure transaction. The PIN management module 276 can also include the processing required that enables a user to select the unique identifier. Similarly, the certificate management module 280 can create encrypted certificate for use with secure transactions. The drawing code management module 272 can include the processing required to secure a message by using a picture for authentication, where the picture is created by a wireless device user or selected from a database within the wireless device 104. The fingerprint scanner 252 can be used to scan a fingerprint as an added security mechanism and used in authentication. The fingerprint can be secured in the wireless device 104 and stored in a repository within the wireless device 104.

Another module that the wireless device 104 can include is the network access unit 244. The network access unit 244 can be used for connectivity with other communication devices. In one exemplary embodiment, the connectivity can include synchronization between devices. In another exemplary embodiment, the network access unit 244 can work as a medium which provides support for the NFC, Bluetooth®, WiFi, etc., communication. In yet another embodiment, the network access unit 244 can work in conjunction with at least the MAC circuitry 268 and the WiFi Module 248. The network access unit 244 can also work and interact with one or more of the modules described herein.

The modules described and others known in the art can be used with the wireless device 104 and can be configured to perform the operations described herein in conjunction with FIG. 1 and FIGS. 3-8.

Figure 3:
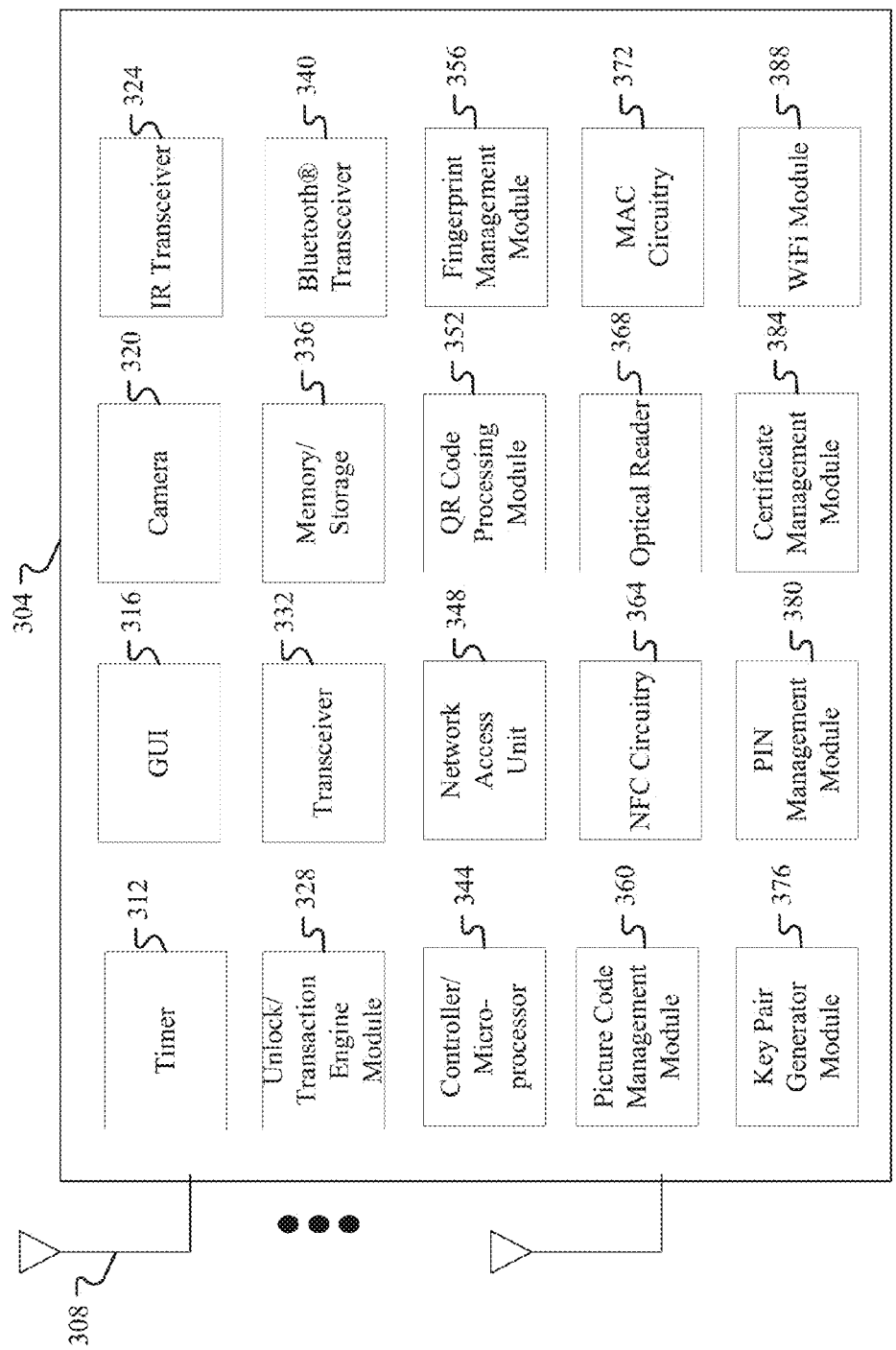
FIG. 3 illustrates an exemplary communication device architecture.

An example of a communication device 304 architecture is shown in FIG. 3. The communication device 304 may comprise hardware circuitry and/or software that conduct various operations as discussed herein. The communication device 304 also includes conventional and well known components which have been omitted for clarity. The operations can include, but are not limited to, communicating with wireless devices 104, transacting via NFC, IR, Wi-Fi, Bluetooth®, etc., unlocking secured codes, timing applications, etc. The communication device 304 can be any type of computing system operable to conduct the operations described here. As an example, the communication device 304 which can include a reader, can interact with various modules and components 312-388 as shown in FIG. 3.

The communication device 304 can contain some or all the same modules/components as wireless device 104. For example, the communication device 304 can include a transceiver 332, Bluetooth® transceiver 340, IR transceiver 324, MAC Circuitry 372, WiFi Module 388, NFC Circuitry 364, and Network Access Unit 348 for communicating with another device, such as the wireless device 104. The communication device 304 can also include input/output devices for inputting/outputting data to and from the communication device 304. For example, the communication device 304 can include camera 320, Graphical User Interface (GUI) 316, and other devices such as microphone, recorder, display, touchscreen, etc. (not shown). The camera, for example, can work with an application and/or processor to optically read and process a QR code for transfer of data from the wireless device 104 and the communication device 304. Modules for general storage, processing, and reception can also be present in the communication device architecture, such as memory/storage 336, controller/microprocessor 344, and antennas 308.

In addition, the wireless device 304 can include modules that decode or manage some or all of the data codes (i.e., barcodes, pictures, QR codes, IR codes, fingerprints, pictures, PINs, etc.) transmitted by the wireless device 104. Such modules include the PIN management module 380, certificate management module 384, QR code processing module 352, picture code management module 360, fingerprint management module 356, and optical reader 368. Further, in some instances, the communication device 304 can include a key pair generator module 376 to generate a key to be read by the wireless device 104, for transmitting secure data to the communication device 304.

The communication device 304 architecture can also include an unlock/transaction engine module 328 which can work with two or more codes concurrently in order to unlock the secure data transmitted by the wireless device 104. For example, an NFC signal transmitted with a user bank information can be transmitted simultaneously with a fingerprint, which the NFC Circuitry 364 and fingerprint management module 356 can process, and the unlock/transaction engine module 328 can unlock. The unlock/transaction engine module 328 can also process the information after the secure data transmitted is unlocked and decrypted.

A timer 312 can also optionally be part of the communication device 304 architecture, and can work jointly or independently of any of the management modules and/or the unlock/transaction engine module 328 in securing the encrypted information transmitted by the wireless device 104. For example, a timer can end a transaction if the transaction is not completed within the allotted time in order to protect against network vulnerabilities. Details regarding the use of codes in transactions using NFC communications and the use of a timer are described in further detail below and in conjunction with FIGS. 4-8.

The modules described and others known in the art can be used with the communication device 304 and can be configured to perform the operations described herein in conjunction with FIG. 1-2 and FIGS. 4-8

Figure 4:
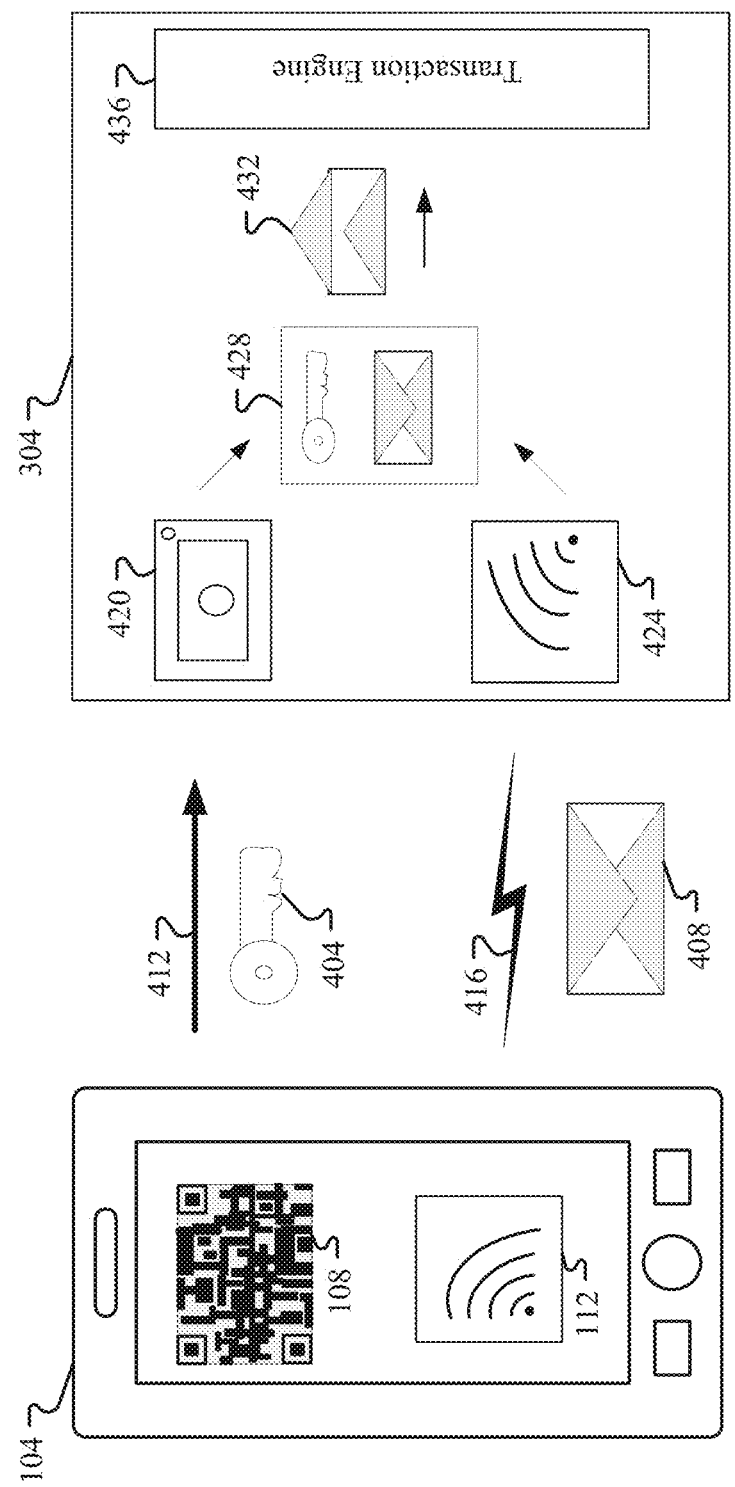
FIG. 4 illustrates an exemplary block diagram of a Protected NFC transaction using QR codes.

FIG. 4 is an exemplary diagram of a protected NFC transaction using QR codes. In this protected NFC transaction, the process begins with the generation of a QR code 108 by the wireless device 104. The QR Code 108 contains a key 404 used to decrypt a message arriving over an NFC/RF channel 416 within a proximate time. The QR code 108 with the embedded key 404 is carried over an augmenting channel 412 and read by a camera/optical reader 420 in the communication device 304. The augmenting channel 412 can be a proximity based communication channel that works within a line of sight (LOS) of the communication device 304 (i.e., a line of sight optical communication channel). The communication device 304, collects the key 404 and feeds it to the unlock engine 428 for use at the arrival of the compatible message over an NFC/RF channel 416.

The compatible message created by the wireless device 104, is a message carrying NFC transaction data 112 over an NFC/RF or primary channel 416 to the communication device 304. The NFC transaction data 112 is encrypted prior to transmission over the NFC/RF channel 416 and sent as a hardened NFC message 408. A timer (not shown) can be used to ensure that the receipt of the NFC transaction data 112 is in a timely manner in order to protect against system vulnerabilities by ending the transaction if not received on time. The NFC/RF channel 416 can carry the hardened NFC message 408, which is received at the communication device 304 as a secure message 424. The secure message 424, like the key 404, is input into the unlock engine 428. The key 404 which arrived on the augmenting channel 412 is use to unlock/decrypt the secure message 424. The decrypted transaction data 432 is transferred for processing to the transaction engine 436. Further details regarding the unlock and transaction engine are described above and in conjunction with FIG. 3. An example of this protected transaction can include a protected NFC equipped device, such as a badge with a secondary code, which is scanned for building access. The badge includes a QR code sticker which includes the code that unlocks the door when combined with the badge user's information which is transmitted over the NFC channel to the protected NFC badge reader and decrypted by the unlock engine for processing by the transaction engine leading to an unlocked door.

The configurations shown and order of the process can also be modified. For example, the hardened NFC message 408 can arrive at the communication device 304 before the key 404 and stored in the unlock engine 428 until the key 404 arrives or is read.

Figure 5:
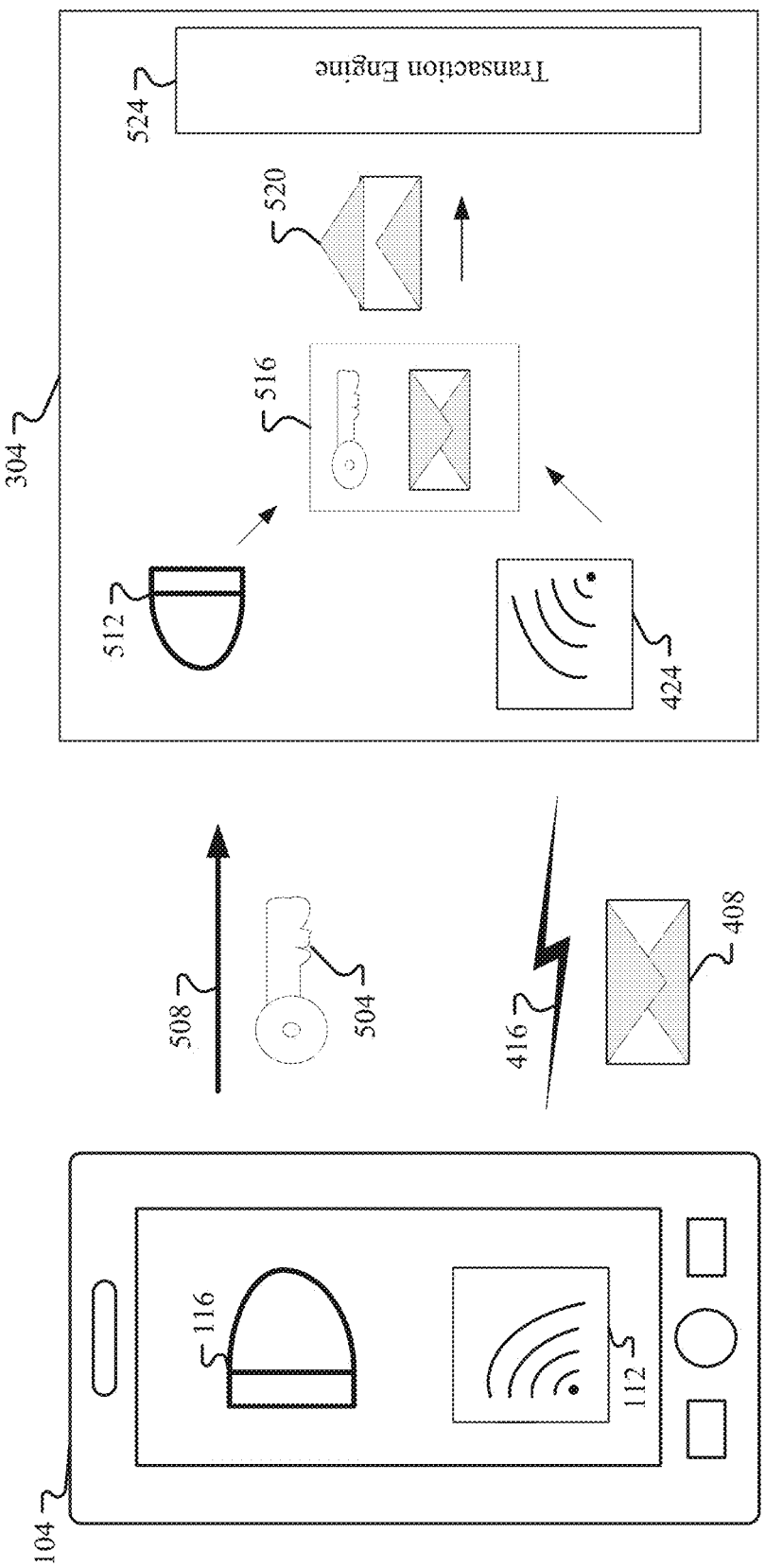
FIG. 5 illustrates an exemplary block diagram of a Protected NFC transaction using IR codes.

FIG. 5 is an exemplary diagram of a Protected NFC transaction using Infrared (IR) codes 116. In addition to or as an alternative other codes can be used in the protected NFC transaction, such as, but not limited to, PINs, fingerprints, pictures, drawings, digital certificates, etc. The protected transaction is initiated when the IR code 116 stored in the wireless device 104 is powered by the energy emitted by the communication device 304. Alternatively, the IR code 116 stored within the wireless device 104 can initiate the transaction when it is directly transferred via an infrared channel 508 to the communication device 304. The infrared channel 508 can be a light carrying channel which can carry the infrared light pulses of the IR code 116.

The IR code 116 contains a key 504 used to unlock the NFC transaction data 112 that will be contained in a secure message 424 arriving via the NFC/RF channel 416 at the communication device 304 prior to, simultaneously or after the arrival of the IR code 116. The key 504 is detected by the IR transceiver 324 (not shown) which works in conjunction with the unlock engine 516 to translate the infrared light pulses into binary codes 512 that have the corresponding commands/information (i.e., key 504) to unlock the secure message 424.

The NFC transaction data 112 is transactional data that will be encrypted as a hardened NFC message 408 prior to transmission over the NFC/RF channel 416 arriving at the communication device 304 as secure message 424. The protected NFC transaction can optionally include a timer (not shown) which is initiated upon accepting the key 504 at the unlock engine/transaction control engine 516. The NFC signal should then arrive at the communication device 304 before the timer reaches zero or the process terminates. Alternatively, a timer is optionally initiated at the arrival of the secure message 424 at the transaction control engine or unlock engine 516 and the key 504 should arrive at the communication device 304 prior to the timer reaching zero, else the process ends. The NFC signal arriving at the communication device 304 as secure message 424 is fed to the unlock engine 516 and stored until the unlock key 504 has arrived via the infrared channel 508. Once the complementary key 504 is received or recognized as a match for the secured message 424, the secure message 424 is unlocked and the decrypted transaction data 520 is transferred for processing by the transaction engine 524.

Figure 6:
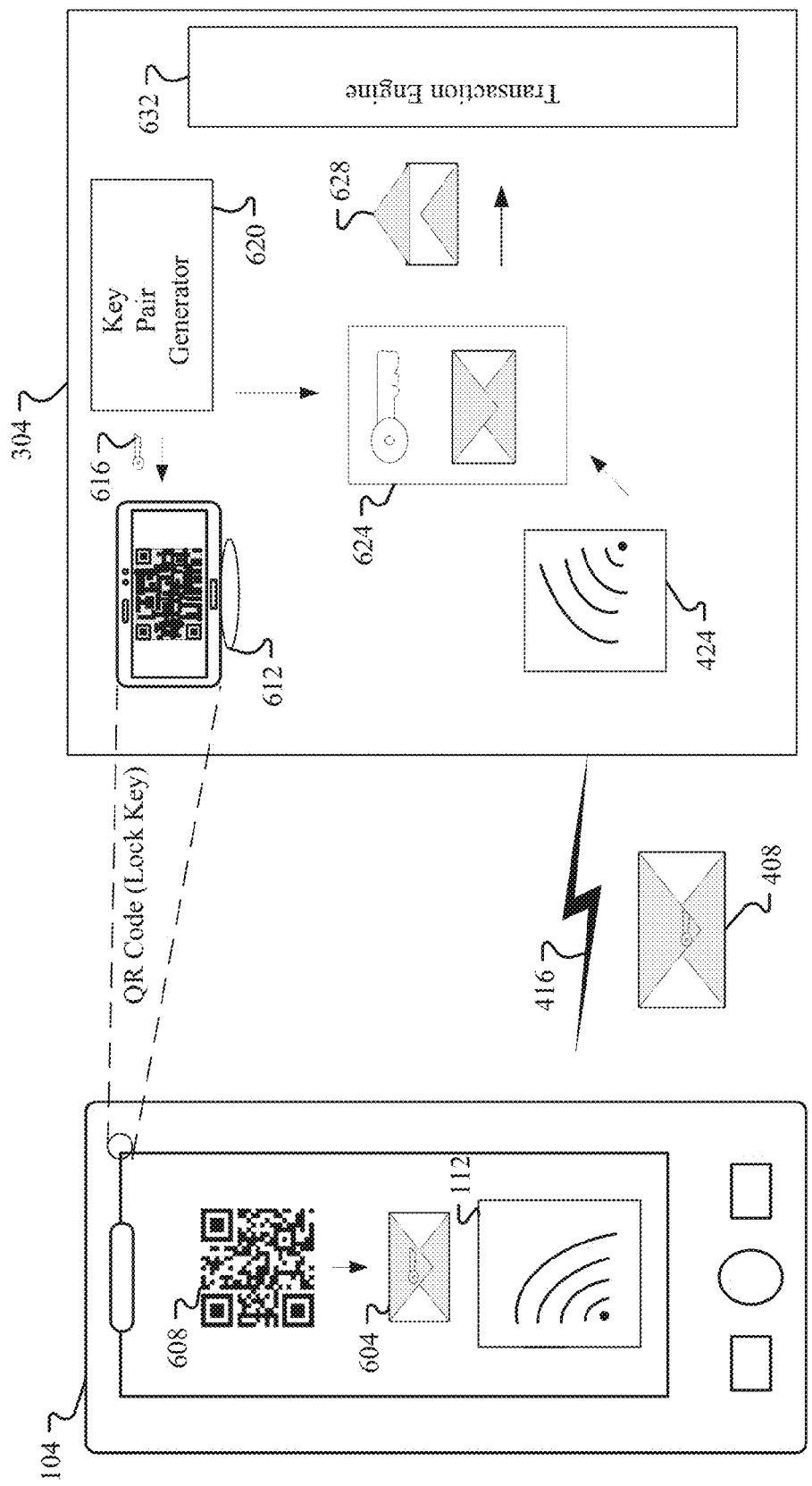
FIG. 6 illustrates an exemplary block diagram of a Protected NFC transaction using a one-time key generator.

FIG. 6 illustrates an exemplary block diagram of a Protected NFC transaction using a one-time key pair generator. In this protected NFC transaction, the transaction is initiated at the communication device 304. As a means for securing the transaction, the communication device 304 initiates the protected NFC transaction by generating a one-time key 616 that is sent to the wireless device 104 in order to encrypt the NFC transaction data 112. The one-time key 616 in this transaction is generated by a one-time key pair generator 620, which feeds the same one-time key 616 to the unlock engine 624.

Once the one-time key 616 is generated, the communication device 304 transfers or sends the one-time key 616 to the wireless device 104 involved in the transaction. In one example, the one-time key 616 can generate a one-time use QR code 612 which is displayed on the screen of the communication device 304 and read by the wireless device 104. In another example, the one-time key 616 can generate a digital image/certificate which is transmitted or read by the wireless device 104. In yet another example, a RFID tag is displayed and read by the wireless device. The codes and methods described herein can include other codes or mechanisms that can be used as keys that will provide the added security in the protected NFC transaction.

Alternatively, the wireless device 104 can contain a key pair generation module which creates the one-time key 616 which in turn generates a one-time/single use code that is read by the communication device 304 and/or combined with the NFC transaction data 112. Optionally, the key pair generation module in the wireless device 104 can share a seed with the one time key generation module of the communication device 304 such that they can independently create their own independent keys.

Using the QR code example from above, the wireless device 104 receives or reads the QR code 608 and with the QR code 608 and the NFC transaction data 112 creates a locked message 604 that is transmitted over a primary channel or NFC/RF channel 416 as a hardened NFC message 408. The hardened NFC message 408 arrives at the communication device 304 as secure message 424 and is routed to the unlock engine 624 for processing. The unlock engine 624 collects the one-time key 616, created by the key pair generator 620, and the secure message 424, and unlocks and decrypts the secure message 424. The decrypted transaction data 628 then proceeds to the transaction engine 632 for processing.

While some of the embodiments discussed herein refer to transaction data, it is to be appreciated that the techniques are not limited to transaction data, such as data to make a purchase, but rather can include any type of data or information such as data to unlock a door, data to access a system, data to authorize transmission of other data, or the like.

Figure 7:
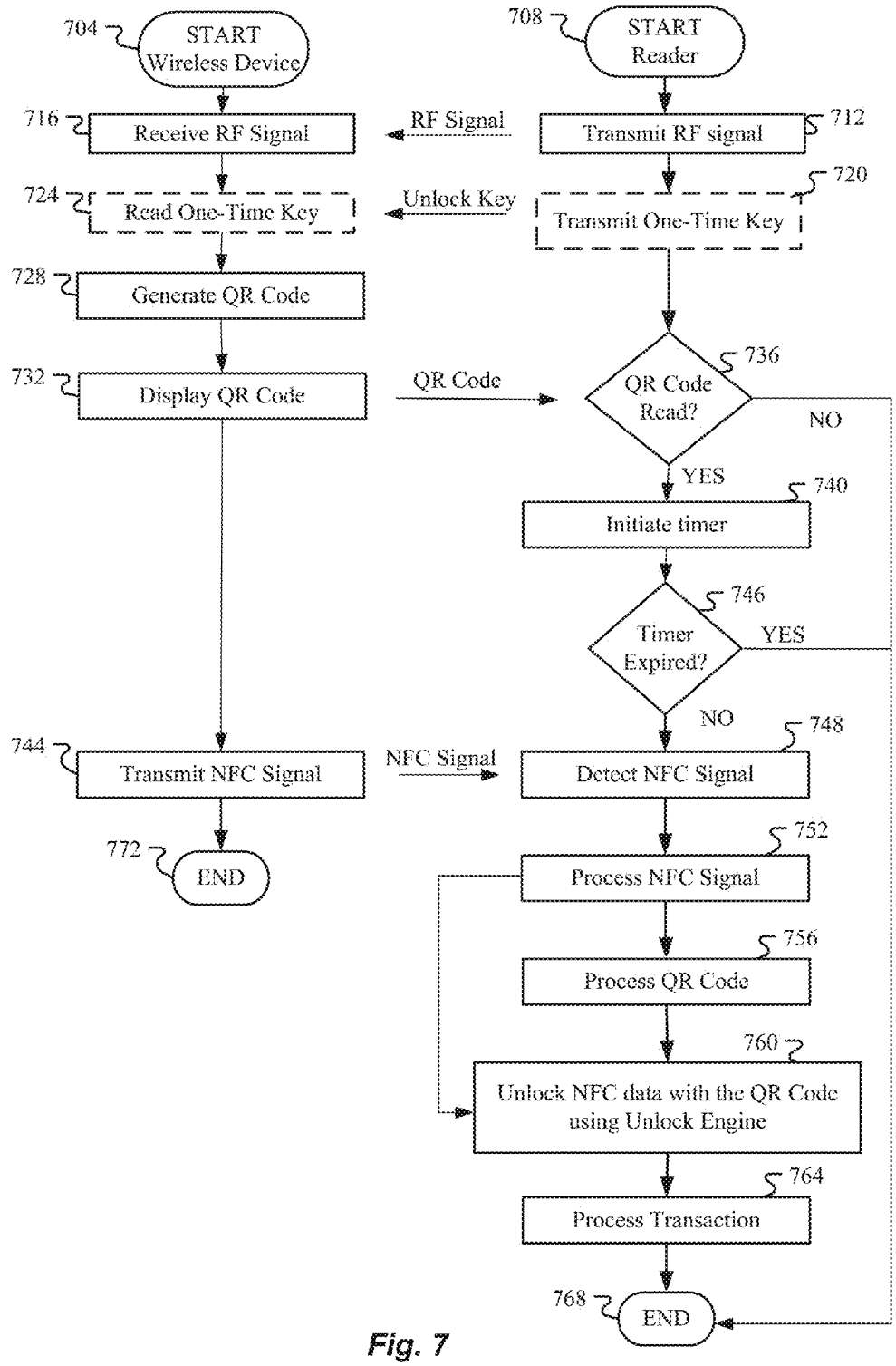
FIG. 7 is a flowchart illustrating a secure NFC transaction with wireless device QR code generation.

FIG. 7 outlines an exemplary flowchart illustrating a secure NFC transaction with wireless device QR code generation. In particular, association begins in steps 708 and 704 between a communication device or reader and a wireless device and continues to step 712. In step 712 the communication device or reader transmits a radio frequency (RF) signal to the wireless device to establish communication between both devices. The RF signal is received at the wireless device in step 716.

Once the devices have associated, the communication device can optionally transmit a one-time key to the wireless device, in step 720. Alternatively, the communication device can use the one-time key to generate a unique code and transmit the unique code to the wireless device. The one-time key is received and read by the wireless device in step 724 and used to generate a unique QR code at step 728. Alternatively or in addition, other codes can be generated, read, and/or transmitted. Such codes can include, but are not limited to, IR codes, pictures, photographs, barcodes, fingerprints, digital certificates, pins, etc. The process continues to step 732, where the QR code is displayed to the communication device. The communication device attempts to read the transmitted QR code containing the embedded key, in step 736, for processing. If no QR code in read, the process is terminated at step 768. Alternatively, if the QR code is read, the process continues to step 740. At step 740, a timer is set within the communication device. The timer is put in place as a securing mechanism that protects from man-in-the middle attacks, RFID range extenders, or other such identity and information theft vulnerabilities. The communication device then proceeds to check if the timer has expired at step 746. If the time expired prior to obtain further information from the wireless device, the process ends at step 768. However, if the timer is not expired the process continues with an NFC signal being detected at step 748.

The NFC signal detected is an NFC signal transmitted by the wireless device in step 744, containing secure NFC transaction data. The secure NFC transaction data is processed at step 752, which can include decoding and/or routing the secure NFC transaction data to an unlock engine in step 760. Similarly, the unique QR code received is processed in step 756 and routed to the unlock engine at step 760. At the unlock engine, the processed QR code with the embedded key is used to unlock the secure NFC transaction data. Once the data is unlocked and decrypted, the transaction is processed at step 764 and the process ends at steps 768 and 772.

Figure 8:
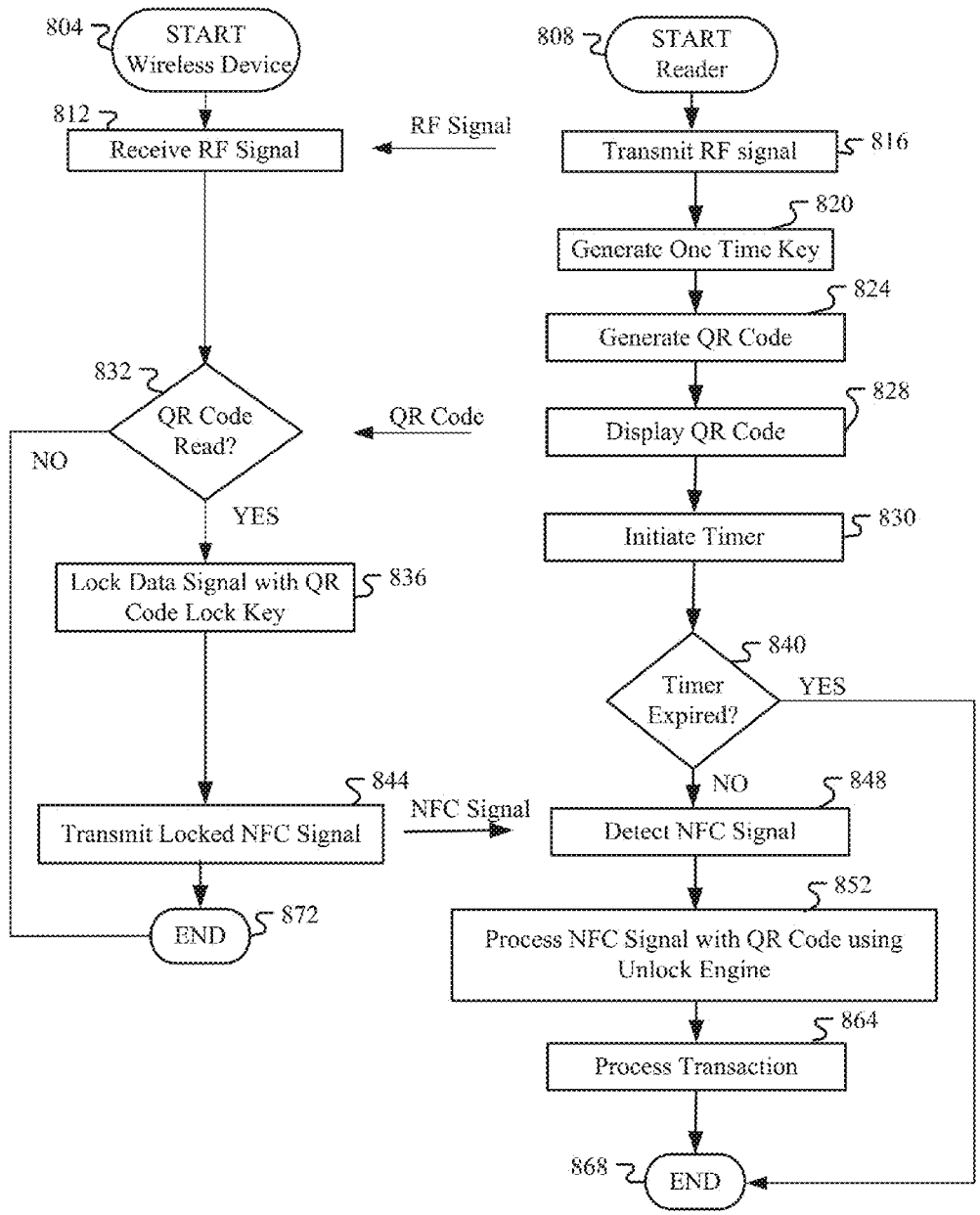
FIG. 8 is a flowchart illustrating a secure NFC transaction with reader QR code generation.

FIG. 8 outlines an exemplary flowchart illustrating a secure NFC transaction with the QR code generated by the reader. In particular, association begins at step 808 and 804 between a communication device or reader and a wireless device and continues to step 816. In step 816 the communication device or reader 304 transmits a radio-frequency (RF) signal to the wireless device in order to establish communication between the devices. The RF signal is received by the wireless device at step 812.

One the devices have associated, the communication device generates a one-time key at step 820 that is used at step 824 to create a unique QR code from the one-time key. The QR code is displayed by the communication device at step 828 and read by the wireless device in step 832. If the QR code is not read by the wireless device the process terminates at step 872. If however, the QR code is read, the process continues to step 836. At step 836, the wireless device uses QR code to lock data that contains transaction information (i.e. bank information) to be transmitted to the communication device. Alternatively, other codes can generated, read, and/or transmitted. Such codes can include, but are not limited to, IR codes, pictures, photographs, barcodes, fingerprints, digital certificates, pins, etc.

Once the wireless device has locked and secured the transaction information in step 836, the information is sent via an NFC communication signal in step 844.

At the communication device, a timer is initiated at step 830 after the QR is displayed to the wireless device at step 828. The timer will run until it expires. If the NFC signal is not received prior to the expiration of the timer at step 840, the process will end at step 868. By ending the process, hackers are cut from obtaining access to the information. Alternatively, if the timer is not expired and an NFC signal is detected in step 848, the process will continue. The NFC signal detected in step 848 is routed to an unlock engine for processing at step 852. At step 852, the NFC signal uses the one-time key generated by the communication device to unlock and decrypt the NFC signal containing the transaction information sent by the wireless device. The transaction in then processed using the transaction information received in step 864 and the process ends at steps 868 and 872. Further, details regarding the transmission of the secure code, NFC signal, and unlock engine described herein are further described above and in conjunction with FIGS. 1-6.

Aspects are thus directed toward a communication device, comprising: a memory; a transceiver, the transceiver configured to: transmit a radio frequency (RF) signal indicating the presence of the communication device and the availability of the communication device to communicate with a wireless device; a processor, the processor configured to: process a secure code, wherein processing the secure code includes sharing the secure code with an unlock engine in the communication device and the wireless device over an augmented optical communication channel; the transceiver further configured to: receive a short range signal over a primary RF channel with secure information from the wireless device; and the processor further configure to: unlock the secure information received over the primary RF channel using the secure code and the unlock engine. Aspects of the above communication device include wherein processing the secure code further includes using a key pair generator to generate a one-time key and wherein the one-time key is used to create a secure code. Aspects of the above communication device include wherein the secure code is displayed to the wireless device using the augmented optical communication channel. Aspects of the above communication device include wherein processing the secure code further includes receiving the secure code over the augmented optical communication channel from the wireless device. Aspects of the above communication device include wherein the one-time key can be generated by the key pair generator in the communication device and the wireless device. Aspects of the above communication device include wherein the secure code is one or more of a QR code, an IR code, a photograph, a digital certificate, or a fingerprint. Aspects of the above communication device include wherein in receiving the short range signal further includes initiating a timer, wherein if the timer expires prior to receipt of the short range signal, the communication ends. Aspects of the above communication device include wherein the short range signal includes an NFC signal. Aspects of the above communication device include wherein the secure information received is hardened by the secure code, and wherein the secure information is hardened when encrypted with the secure code. Aspects of the above communication device include wherein the secure information includes transactional data. Aspects of the above communication device include wherein the secure code is used as a key to unlock the secure information received over the primary RF channel. Aspects of the above communication device include wherein the unlock engine ensures the key compliments the secured information received before processing a transaction.

Embodiments include a method comprising: transmitting, by a transceiver, a radio frequency (RF) signal indicating the presence of a communication device and the availability of the communication device to communicate with a wireless device; processing, by a processor, a secure code, wherein processing the secure code includes sharing the secure code with an unlock engine in the communication device and the wireless device over an augmented optical communication channel; receiving, by the transceiver, a short range signal over a primary RF channel with secure information from the wireless device; and unlocking, by the processor, the secure information received over the primary RF channel using the secure code and the unlock engine. Aspects of the method above include wherein processing the secure code further includes using a key pair generator to generate a one-time key, wherein the one-time key is used to create a secure code, and wherein the secure code is displayed to the wireless device using the augmented optical communication channel. Aspects of the method above include wherein processing the secure code further includes receiving the secure code over the augmented optical communication channel from the wireless device. Aspects of the method above include wherein the one-time key can be generated by the key pair generator in the communication device and the wireless device. Aspects of the method above include wherein the secure code is one or more of a QR code, an IR code, a photograph, a digital certificate, or a fingerprint. Aspects of the method above include wherein in receiving the short range signal further includes initiating a timer, wherein if the timer expires prior to receipt of the short range signal, the communication ends. Aspects of the method above include wherein the short range signal includes an NFC signal. Aspects of the method above include wherein the secure information received is hardened by the secure code, and wherein the secure information is hardened when encrypted with the secure code. Aspects of the method above include wherein the secure information includes transactional data. Aspects of the method above include wherein the secure code is used as a key to unlock the secure information received over the primary RF channel, and wherein the unlock engine ensures the key compliments the secured information received before processing a transaction.

Embodiments include a non-transitory computer readable medium having instructions thereon that when executed by at least one processor of a communication device perform a method comprising: transmitting, by a transceiver, a radio frequency (RF) signal indicating the presence of the communication device and the availability of the communication device to communicate with a wireless device; processing, by a processor, a secure code, wherein processing the secure code includes sharing the secure code with an unlock engine in the communication device and the wireless device over an augmented optical communication channel; receiving, by the transceiver, a short range signal over a primary channel with secure information from the wireless device; and unlocking, by the processor, the secure information received over the primary RF channel using the secure code and the unlock engine. Aspects of the media above include wherein processing the secure code further includes using a key pair generator to generate a one-time key, wherein the one-time key is used to create a secure code and wherein the secure code is displayed to the wireless device using the augmented optical communication channel. Aspects of the media above include wherein processing the secure code further includes receiving the secure code over the augmented optical communication channel from the wireless device. Aspects of the media above include wherein the secure code is one or more of a QR code, an IR code, a photograph, a digital certificate, or a fingerprint. Aspects of the media above include wherein in receiving the short range signal further includes initiating a timer, wherein if the timer expires prior to receipt of short range signal, the communication ends. Aspects of the media above include wherein the short range signal includes an NFC signal. Aspects of the media above include wherein the secure information received is hardened by the secure code, wherein the secure information is hardened when encrypted with the secure code, and wherein the secure information includes transactional data. Aspects of the media above include wherein the secure code is used as a key to unlock the secure information received over the primary RF channel. Aspects of the media above include wherein the unlock engine ensures the key compliments the secured information received before processing a transaction.

Embodiments include a system comprising: means for transmitting a radio frequency (RF) signal indicating the presence of the communication device and the availability of the communication device to communicate with a wireless device; means for processing a secure code, wherein processing the secure code includes sharing the secure code with an unlock engine in the communication device and the wireless device over an augmented optical communication channel; means for receiving a short range signal over a primary RF channel with secure information from wireless device; and means for unlocking the secure information received over the primary RF channel with the secure code and the unlock engine. Aspects of the system above include wherein processing the secure code further includes using a key pair generator to generate a one-time key, wherein the one-time key is used to create a secure code, and wherein the secure code is displayed to the wireless device using the augmented optical communication channel. Aspects of the system above include wherein processing the secure code further includes receiving the secure code over the augmented optical communication channel from the wireless device. Aspects of the system above include wherein the one-time key can be generated by the key pair generator in the communication device and the wireless device. Aspects of the system above include wherein the secure code is one or more of a QR code, an IR code, a photograph, a digital certificate, or a fingerprint. Aspects of the system above include wherein in receiving the short range signal further includes initiating a timer, wherein if the timer expires prior to receipt of short range signal, the communication ends. Aspects of the system above include wherein the short range signal includes an NFC signal. Aspects of the system above include wherein the secure information received is hardened by the secure code, and wherein the secure information is hardened when encrypted with the secure code. Aspects of the system above include wherein the secure information includes transactional data. Aspects of the system above include wherein the secure code is used as a key to unlock the secure information received over the primary RF channel, and wherein the unlock engine ensures the key compliments the secured information received before processing a transaction.

Embodiments include a wireless device, comprising: a memory; a transceiver, the transceiver configured to: receive a radio frequency (RF) signal indicating the presence of a communication device and the availability of the communication device to communicate with the wireless device; a processor, the processor configured to: process a secure code, wherein processing the secure code includes sharing the secure code with an unlock engine in the communication device and the wireless device over an augmented optical communication channel; the transceiver further configured to: transmit a short range signal over a primary RF channel with secure information from the wireless device; and the processor further configure to: unlock the secure information transmitted over the primary RF channel using the secure code and the unlock engine in the communication device. Aspects of the wireless device include wherein processing the secure code includes reading the secure code displayed by the communication device using an augmented optical communication channel. Aspects of the wireless device include wherein the secure code read is used to lock the secure information that is transmitted over the primary RF channel. Aspects of the wireless device include wherein processing the secure code includes at least one of generating or displaying the secure code over the augmented optical communication channel to the communication device. Aspects of the wireless device include wherein the secure code is one or more of a QR code, an IR code, a photograph, a digital certificate, or a fingerprint. Aspects of the wireless device include wherein the short range signal includes an NFC signal. Aspects of the wireless device include wherein the secure information received is hardened by the secure code, and wherein the secure information is hardened when encrypted with the secure code. Aspects of the wireless device include wherein the secure information includes transactional data. Aspects of the wireless device include wherein the secure code is used as a key to unlock the secure information received over the primary RF channel. Aspects of the wireless device include wherein the unlock engine ensures the key compliments the secured information received before processing a transaction.

The exemplary embodiments are described in relation to securing transactions using NFC communications. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to NFC enabled transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however, that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for securing an NFC transaction. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A communication device, comprising:
   a memory;
   a transceiver, the transceiver configured to:
      transmit a radio frequency (RF) signal indicating the presence of the communication device and the availability of the communication device to communicate with a wireless device;
   a processor, the processor configured to:
      process a secure code, wherein processing the secure code includes sharing the secure code with an unlock engine in the communication device and the wireless device over an augmented optical communication channel;
   the transceiver further configured to:
      receive a short range signal over a primary RF channel with secure information from the wireless device; and
   the processor further configure to:
      unlock the secure information received over the primary RF channel using the secure code and the unlock engine.

2. The communication device of claim 1, wherein processing the secure code further includes using a key pair generator to generate a one-time key and wherein the one-time key is used to create a secure code.

3. The communication device of claim 2, wherein the secure code is displayed to the wireless device using the augmented optical communication channel.

4. The communication device of claim 1, wherein processing the secure code further includes receiving the secure code over the augmented optical communication channel from the wireless device.

5. The communication device of claim 2, wherein the one-time key can be generated by the key pair generator in the communication device and the wireless device.

6. The communication device of claim 1, wherein the secure code is one or more of a QR code, an IR code, a photograph, a digital certificate, or a fingerprint.

7. The communication device of claim 1, wherein in receiving the short range signal further includes initiating a timer, wherein if the timer expires prior to receipt of the short range signal, the communication ends, and wherein the short range signal includes an NFC signal.

8. The communication device of claim 1, wherein the secure information received is hardened by the secure code, wherein the secure information is hardened when encrypted with the secure code, and wherein the secure information includes transactional data.

9. The communication device of claim 1, wherein the secure code is used as a key to unlock the secure information received over the primary RF channel, and wherein the unlock engine ensures the key compliments the secured information received before processing a transaction.

10. A method comprising:
    transmitting, by a transceiver, a radio frequency (RF) signal indicating the presence of a communication device and the availability of the communication device to communicate with a wireless device;
    processing, by a processor, a secure code, wherein processing the secure code includes sharing the secure code with an unlock engine in the communication device and the wireless device over an augmented optical communication channel;
    receiving, by the transceiver, a short range signal over a primary RF channel with secure information from the wireless device; and
    unlocking, by the processor, the secure information received over the primary RF channel using the secure code and the unlock engine.

11. The method of claim 10, wherein processing the secure code further includes using a key pair generator to generate a one-time key, wherein the one-time key is used to create a secure code, and wherein the secure code is displayed to the wireless device using the augmented optical communication channel, and wherein processing the secure code further includes receiving the secure code over the augmented optical communication channel from the wireless device.

12. The method of claim 10, wherein in receiving the short range signal further includes initiating a timer, wherein if the timer expires prior to receipt of the short range signal, the communication ends, and wherein the short range signal includes an NFC signal.

13. The method of claim 10, wherein the secure information received is hardened by the secure code, wherein the secure information is hardened when encrypted with the secure code, and wherein the secure information includes transactional data.

14. The method of claim 10, wherein the secure code is used as a key to unlock the secure information received over the primary RF channel, and wherein the unlock engine ensures the key compliments the secured information received before processing a transaction.

15. A non-transitory computer readable medium having instructions thereon that when executed by at least one processor of a communication device perform a method comprising:
    transmitting, by a transceiver, a radio frequency (RF) signal indicating the presence of the communication device and the availability of the communication device to communicate with a wireless device;
    processing, by a processor, a secure code, wherein processing the secure code includes sharing the secure code with an unlock engine in the communication device and the wireless device over an augmented optical communication channel;
    receiving, by the transceiver, a short range signal over a primary RF channel with secure information from the wireless device; and
    unlocking, by the processor, the secure information received over the primary RF channel using the secure code and the unlock engine.

16. The non-transitory medium of claim 15, wherein processing the secure code further includes using a key pair generator to generate a one-time key, wherein the one-time key is used to create a secure code and wherein the secure code is displayed to the wireless device using the augmented optical communication channel.

17. The non-transitory medium of claim 15, wherein processing the secure code further includes receiving the secure code over the augmented optical communication channel from the wireless device.

18. The non-transitory medium of claim 16, wherein the secure information received is hardened by the secure code, wherein the secure information is hardened when encrypted with the secure code, and wherein the secure information includes transactional data.

19. The non-transitory medium of claim 16, wherein the secure code is used as a key to unlock the secure information received over the primary RF channel, and wherein the unlock engine ensures the key compliments the secured information received before processing a transaction.

20. A wireless device, comprising:
a memory;
a transceiver, the transceiver configured to:
   receive a radio frequency (RF) signal indicating the presence of a communication device and the availability of the communication device to communicate with the wireless device;
a processor, the processor configured to:
   process a secure code, wherein processing the secure code includes sharing the secure code with an unlock engine in the communication device and the wireless device over an augmented optical communication channel;
the transceiver further configured to:
   transmit a short range signal over a primary RF channel with secure information from the wireless device; and
the processor further configure to:
   unlock the secure information transmitted over the primary RF channel using the secure code and the unlock engine in the communication device.

21. The wireless device of claim 20, wherein processing the secure code includes reading the secure code displayed by the communication device using an augmented optical communication channel, and wherein the secure code read is used to lock the secure information that is transmitted over the primary RF channel.

22. The wireless device of claim 20, wherein processing the secure code includes at least one of generating or displaying the secure code over the augmented optical communication channel to the communication device.

23. The wireless device of claim 22, wherein the secure code is used as a key to unlock the secure information received over the primary RF channel, and wherein the unlock engine ensures the key compliments the secured information received before processing a transaction.

* * * * *